March 24, 1964 D. N. STREETER 3,126,535

TRANSDUCER POSITIONING SYSTEM

Filed Dec. 27, 1961 2 Sheets-Sheet 1

*INVENTOR.*
DONALD NELSON STREETER

*BY* David N. Koffsky

AGENT

TRANSDUCER POSITIONING SYSTEM

Filed Dec. 27, 1961 2 Sheets-Sheet 2

United States Patent Office 3,126,535

Patented Mar. 24, 1964

3,126,535

TRANSDUCER POSITIONING SYSTEM

Donald N. Streeter, Cochituate, Mass., assignor to International Business Machines Corporation, New York, N.Y., a corporation of New York Filed Dec. 27, 1961, Ser. No. 162,407
5 Claims. (Cl. 340—174.1)

This invention relates to memory systems utilizing transducers and, more particularly, to an automatic servo-positioning system for the transducers.

In the sensing of data recorded on discs or drums, the position of the read head in relation to the data track being read is quite critical. Misalignment can cause the output from the read head to either be distorted or at too low a level for recognition purposes.

Misalignment of the read head may be caused by any of a number of factors. A data track may have had a first portion recorded at one time and another portion recorded at a second time, the recording head becoming misaligned in the intervening period. The read head positioning mechanism may have become worn, thus placing it at a position other than the best adapted to read the desired track. A disc on which the information has been pre-recorded may be mounted in a slightly eccentric manner, thereby causing distortion in the read head output as the track passes thereunder. For these and other reasons, it is of absolute necessity that the read head be always accurately positioned over the data track being read.

The prior art has attempted to cope with this problem in a variety of ways. Open loop methods have been used wherein the positioning of the read head was mechanically set during manufacture and then readjusted in the field. This was unsatisfactory both in terms of cost, because of the extreme accuracy needed in the positioning mechanism, and in upkeep due to the continual field adjustment which was needed. Closed loop systems have also been employed where separate positioning tracks were recorded coincidentally with the data tracks. Specially grooved record discs have also been used wherein the read-recording head was positioned by virtue of its spatial relation to the groove. Although these methods have proven satisfactory for positioning of the head, they all require extra tracks on the disc, special disc configurations, or some other modification of the memory device. These methods also reduce the number of available recording tracks per disc or drum, consequently giving rise to a low track density.

Thus, it is one object of the present invention to provide a memory with an improved positioning system for its associated transducer. Another object is to provide a memory read head positioning system wherein the positioning of the read head is continuously adjusted to its optimum point.

Another object is to provide an improved positioning system for a transducer associated with a memory wherein the positioning information is derived directly from the recorded track being read.

A further object is to provide a simple positioning system for a transducer associated with memory, which does not require any special configuration of the memory.

A still further object is to provide an automatic fine positioning system for the read head of a memory which will allow greater density of memory tracks per memory disc or drum than has been heretofore attainable.

In accordance with a preferred embodiment of the invention, the foregoing objects are achieved by providing a small transverse oscillatory motion to a transducer after it has been positioned in the general area of the data track to be read on the second member. The oscillatory motion of the transducer causes an amplitude modulation of the signals being read. The phase of the modulated output signal relative to the oscillatory motion is dependent upon the relative positioning of the transducer and the recording track. This furnishes the necessary indication as to whether the transducer is positioned at its optimum sensing point. Means are, therefore, provided, responsive to the aforementioned phase relationship, for changing the position of the magnetic transducer in such a direction as to center it over the track.

The foregoing and other objects, features and advantages of the invention will be apparent from the following more particular description of preferred embodiments of the invention, as illustrated in the accompanying drawings.

Figure 1:
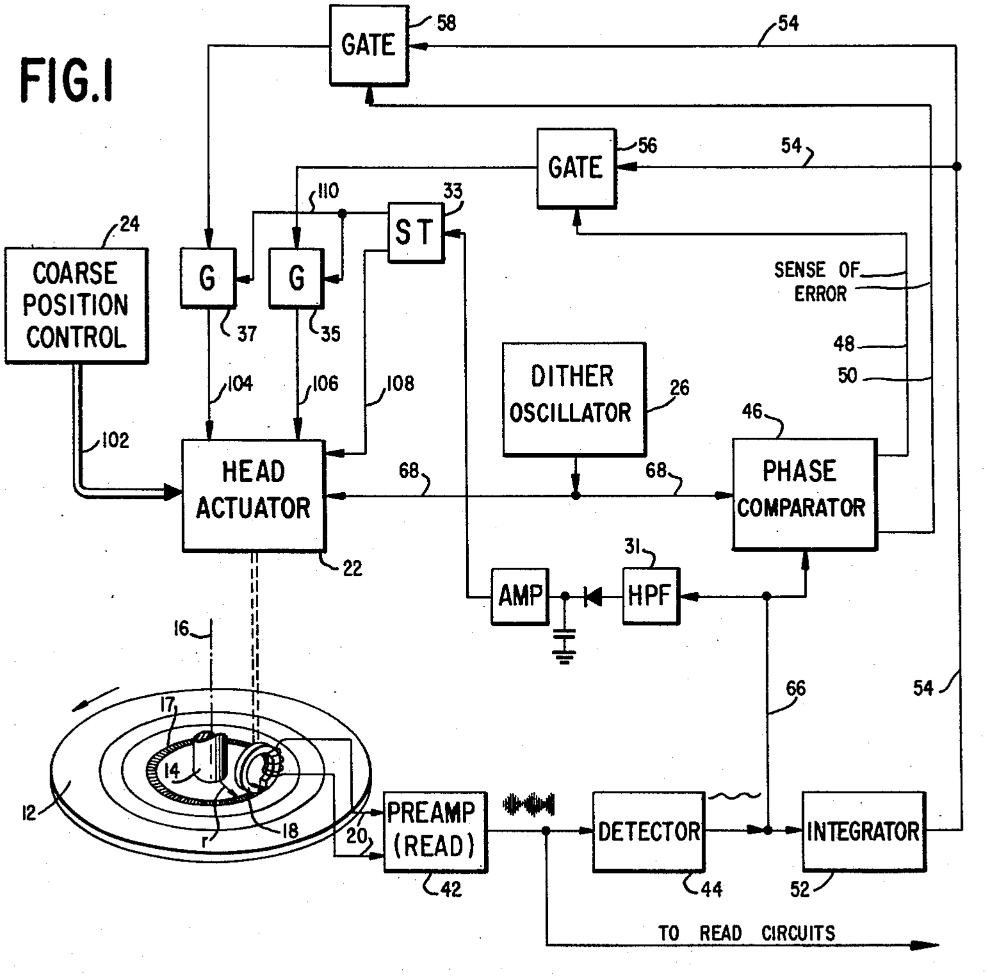
FIG. 1 is a block diagram of a system embodying the invention.

Referring now to FIG. 1 there is illustrated a preferred embodiment of the invention, comprising a magnetic disc 12 which rotates about center shaft 14 with a constant angular velocity. Recorded on disc 12 are plurality of data tracks of which data track 17 is one. Data track 17 is composed of a plurality of discrete data bits recorded at a constant radius from the center line 16 of shaft 14. Positioned directly above data track 17 is a magnetic head 18. As data track 17 rotates beneath head 18, a series of discrete voltage pulses are induced in the head, thereby causing a signal to be applied to lead 20.

Magnetic head 18 is positioned by head actuator 22, which is in turn controlled by several inputs. The primary inputs to head actuator 22 are the coarse positioning signals applied over cable 102 from coarse position control 24. These signals control head actuator 22 to position magnetic head 18 over the desired track on magnetic disc 12. It is the inaccuracies of this coarse positioning which are overcome by the present invention.

Also applied to head actuator 22 is the output of dither oscillator 26, a constant amplitude oscillatory signal on conductor 68. This signal, being of small amplitude, causes head 18 to oscillate slightly around its basic track position. The oscillation of the magnetic head 18 will hereinafter be referred to as dither. The dither of magnetic head 18 about its basic track position results in a sinusoidal amplitude modulation of the signals generated by the data track. The other inputs to head actuator 22 will be described hereinafter.

Figure 2:
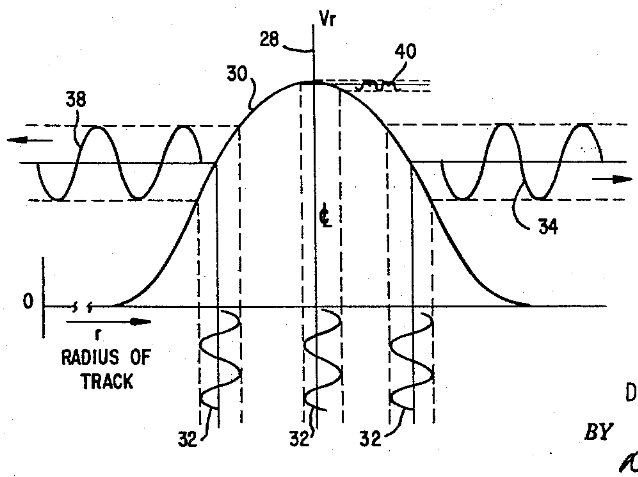
FIG. 2 is a graphical representation of voltage waveforms as they appear under certain conditions of operation of the subject invention.

In FIG. 2, curve 30 represents the average voltage which is induced in magnetic head 18 when it is at various positions in the vicinity of the center line 28 of data track 17. When the magnetic head 18 is positioned directly over the center line 28, the voltage induced therein is a maximum; but, as it moves either to the right or left of center line 28, the voltage induced therein is reduced. Now, assume that head 18 is positioned to a point to the right of the center line 28 by head actuator 22. Waveform 32 (see also FIG. 3) is representative of the excursions of magnetic head 18 as the dither voltage is applied thereto. As magnetic head 18 is caused to dither about its basic position, the induced voltage on lines 20 assumes the modulated waveform shown by curve 34 (see FIG. 3). (Note: only the modulation waveform of the data bits is shown.) The output waveform 34 is phase inverted, that is, 180 degrees out-of-phase.

Figure 3:
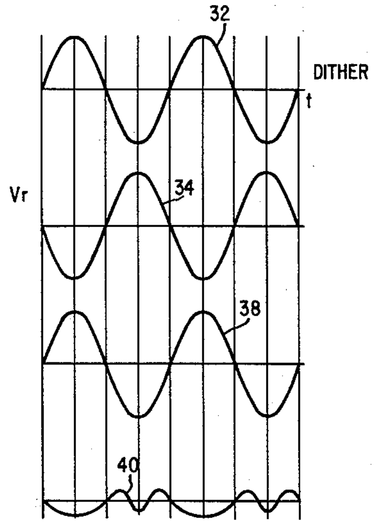
FIG. 3 is a more detailed graph of the waveforms under consideration, showing their relative phases.

Should head actuator 22 position magnetic head 18 to the left of center line 28, the result would be as indicated by waveform 38 (see also FIG. 3). Note that in this case, waveform 38 has an in-phase relationship with the dither voltage 32. It is thus obvious that when the voltages assume this relationship, magnetic head 18 must be moved towards the periphery (or away from the center) of disc 18 for it to assume the desired positioning over the center line 28 of track 17. Conversely, in the case where the voltages have an out-of-phase relationship, the magnetic head 18 must be moved towards the center of magnetic disc 12 to obtain proper positioning.

When head 18 is positioned directly over the center line 28 or slightly off to one side or the other, the modulation waveform attains both a double frequency component and a greatly reduced amplitude. This phenomenon is illustrated by waveform 40.

Referring now back to FIG. 1, and the circuitry which utilizes the aforementioned phase relationships for the fine positioning of head 18, the modulated output which appears on leads 20 is applied to a read preamplifier 42. From there, the amplified modulated data signals are simultaneously fed to the read circuits and detector 44.

Detector 44 may be of the well-known diode type which recovers the modulation waveform from the amplitude modulated pulses. Such a circuit may be found on page 364 of "Engineering Electronics" by Happell and Hesselberth, McGraw-Hill, 1953. The output of detector 44 may be any of the waveforms shown in FIG. 3, that is, 34, 38, or 40, depending upon the relative position of the magnetic head 18 and the center line 28 of data track 17. Its output is fed simultaneously to high pass filter 31, integrator 52 and phase comparator 46.

Filter 31 produces an output only when a frequency component which is twice that of dither oscillator 26 predominates in the output of detector 44. An output from filter 31 thus indicates that magnetic head 18 is centered over the data track. So long as filter 31 produces no output, the input to Schmitt trigger 33 is deenergized. Under this condition, Schmitt trigger 33 deenergizes complement conductor 108 and energizes conductor 110 which in turn conditions gates 35 and 37 for the passage of vernier correction signals on conductors 104 and 106. An exemplary showing of a Schmitt trigger may be found at page 165 of Pulse and Digital Circuits, by Milman and Taub, published by McGraw-Hill, 1956. If filter 31 produces an output, it is detected, filtered, amplified and applied to the input to Schmitt trigger 33, which then deenergizes conductor 110 thereby deconditioning gates 35 and 37 and energizes complement conductor 108. The deconditioning of gates 35 and 37 prevents any further vernier correction voltages from affecting head actuator 22. The energization of complement conductor 108 detents the vernier correction mechanism in head actuator 22, in a manner which will be explained hereinafter.

The detected modulation output of detector 44 is also applied to integrator 52, which smooths the amplitude variations and applies its output as the vernier correction voltage to conductor 54.

In addition to the output from detector 44, the output of dither oscillator 26 is also fed to phase comparator 46. Phase comparator 46 determines whether the output from detector 44 is in-phase or 180 degrees out-of-phase with the output of dither oscillator 26. If an in-phase relationship exists, that is, waveforms 32 and 38 of FIG. 3, then a positive voltage is applied to line 48; however, if an out-of-phase relationship exists, i.e. waveforms 32 and 34 of FIG. 3, then a positive voltage is applied to line 50.

If a positive voltage is applied to line 48 by phase comparator 46, gate 56 is conditioned and the vernier correction voltage applied by integrator 52 to line 54 is allowed to pass therethrough and thence through conditioned gate 35 on conductor 106 to head actuator 22. This voltage causes head actuator 22 to move magnetic head 18 away from the center of the disc 12 towards the center line of track 17. Should, however, phase comparator 46 apply a positive voltage to line 50, gate 58 is conditioned to pass the vernier correction voltage on line 54 through gate 37 on conductor 104 to head actuator 22. This moves magnetic head 18 towards the center of disc 12 and the center line 28 of track 17.

When magnetic head 18 is positioned over the center line 28 of track 17, the data modulation waveform decreases in amplitude and attains a double frequency component (twice the frequency of the dither oscillations). In this case, the output of integrator 52 is insufficient to cause much corrective action, but to prevent any "hunting" from occurring, the fine positioning circuitry is disabled and the vernier positioning mechanism in head actuator 22 detented. As explained before, high pass filter 31, in response to the double frequency component input from detector 44, produces an output which is detected, filtered, amplified and applied to Schmitt trigger 33. Schmitt trigger 33 thereby deenergizes conductor 110 which disables gates 35 and 37 cutting off any vernier corrective signals to head actuator 22. Simultaneously inverter 33 energizes conductor 108 which detents the vernier correction means within head actuator 22.

If the head 18 later becomes misaligned, the double frequency component of the output from detector 44 will vanish and gates 35 and 37 will become once more conditioned for the passage of vernier correction voltages.

Figure 4:
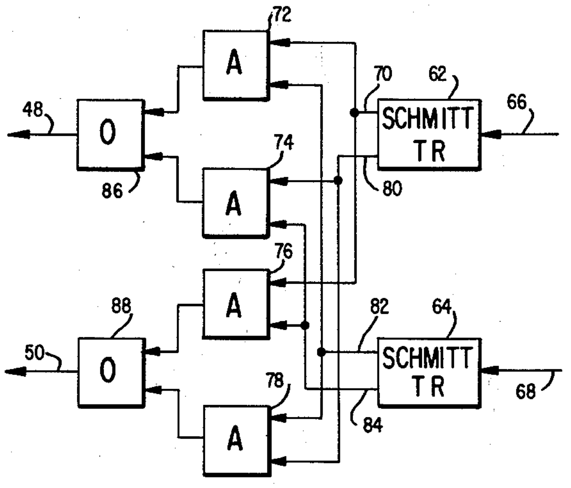
FIG. 4 is a block diagram of an exemplary phase comparator.

Referring now to FIG. 4, there is shown a block diagram of a representative phase comparator which may be utilized in this invention. The inputs 66 and 68, of Schmitt triggers 62 and 64 are respectively connected to detector 44 and dither oscillator 26. When a positive output from detector 44 is sensed on line 66, Schmitt trigger 62 applies an up-level to lead 70, thus partially conditioning AND gates 72 and 76. When the output from detector 44 (as applied to lead 66) goes negative, Schmitt trigger 62 provides an up-level on lead 80, which is applied to AND gates 74 and 78. Likewise, for the two conditions of input on lead 68, Schmitt trigger 64 will produce up-levels respectively on leads 82 and 84, which are, in turn, applied to the several AND gates.

It can, thus, be seen that, when there is an in-phase relationship between the voltages appearing on input leads 66 and 68, AND gate 72 will be conditioned for the positive half cycle and AND gate 74 will be conditioned for the negative half cycle, thereby resulting in a continual output from OR circuit 86 on line 48. If, on the other hand, there is an out-of-phase relationship between the voltages appearing on inputs 66 and 68, AND gates 76 and 78 will be respectively energized, thereby causing OR circuit 88 to produce a continual output on line 50.

Figures 5, 6:
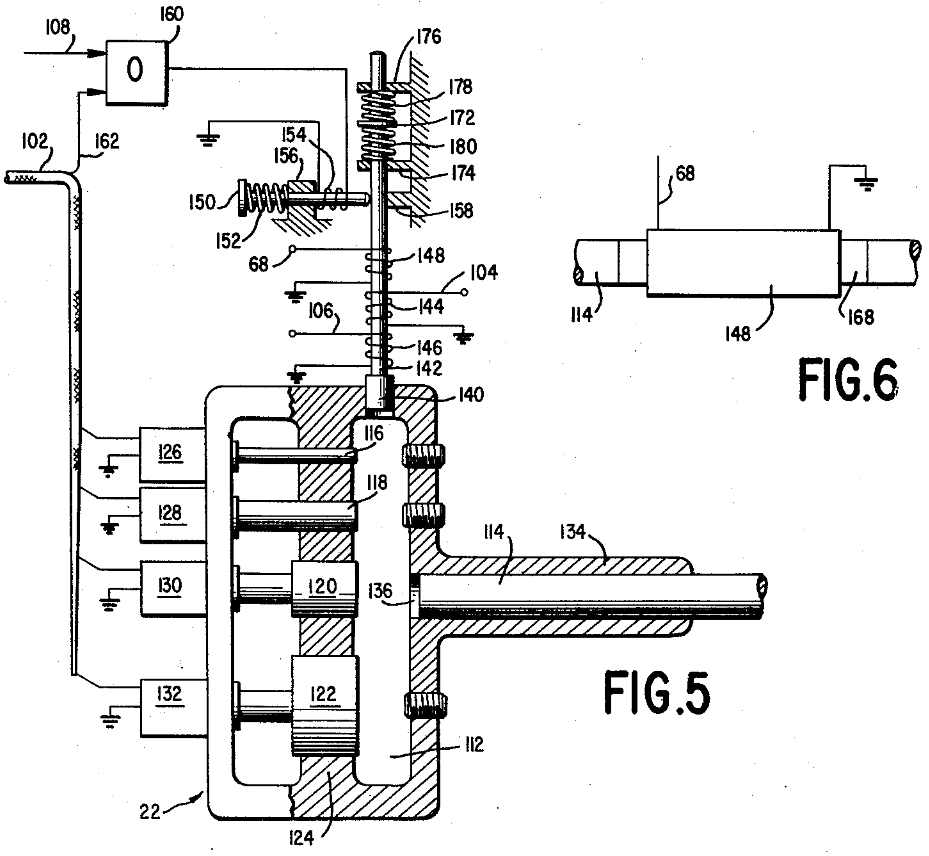
FIG. 5 is a sectional view of a representative type of transducer actuator.
FIG. 6 is a view of a modification to the transducer actuator shown in FIG. 5.

With reference to FIG. 5, there is shown a sectional view of an exemplary head actuator 22. This actuator constitutes a modified version of the hydraulic positioning device described and claimed in U.S. Patent 2,927,432, to Parry. As described therein, the housing of head actuator 22 includes sleeve 134 having a bore 136 extending therethrough and into communication with a hydraulic chamber 112. Reciprocably mounted in bore 136 is arm 114 which has magnetic head such as the head 18 of FIG. 1, mounted at the other extremity (not shown). Four reciprocable increment pistons 116, 118, 120, and 122 are slidably held by separating wall 124 and extend into hydraulic chamber 112. Hydraulic chamber 112 is filed with a suitable hydraulic fluid. Each of the increment pistons 116, 118, 120, and 122 has an operative linkage to respective actuating solenoids 126, 128, 130 and 132 which are mounted on the outer wall of head actuator 22. Control signals for each of solenoids 126, 128, 130 and 132 are provided by cable 102, the other end of which is connected to coarse position control 24 (FIG. 1).

Each of the increment pistons 116, 118, 120 and 122 is indicated in its unactuated position. Upon energization of an actuating solenoid, the associated increment piston moves into hydraulic chamber 112 until the corresponding piston head engages the end of an associated adjusting screw. The screw associated with piston 120 is not shown.

As the piston head of an actuated increment piston moves into hydraulic chamber 112, it displaces an equivalent volume of fluid from the chamber 112 into bore 136 effecting a displacement of arm 114 (and thus magnetic head 18). The operational volumes of each of the increment piston heads differ from each other but are related in a binary fashion. Thus, an actuation of increment piston 118 effects twice as great a displacement of arm 114 as is effected by an actuation of the smallest piston 116; an actuation of piston 120 effects four times the displacement of piston 116, etc. Therefore, by actuating a selected one or selected ones of these pistons through the application of signals to their respective actuating solenoids, a coarse positioning of arm 114 and head 18 may be effected. Of course, more or less, pistons may be used depending upon the number of tracks over which head 18 is to be positioned.

For vernier positioning of the arm 114, a vernier correction system is utilized. The vernier correction system shown (enlarged for clarity) comprises piston 140 to one end of which is operatively connected ferrous rod 142. Wound around ferrous rod 142 are coils 146, 144 and 148 to which are connected respectively, input conductors 106, 104 and 68. Conductors 106 and 104 carry the vernier correction signals from gates 35 and 37 and conductor 68 carries the dither voltage from dither oscillator 26. The upper end of ferrous rod 142 includes an enlarged portion 172 disposed between support members 174 and 176. Two opposed springs 178 and 180 act to maintain enlarged portion 172 centered between support members 174 and 176. When no signals are applied to coils, 148, 144 and 146, springs 178 and 180 keep ferrous rod 142 and piston 140 at the zero position. The application of the dither voltage to coil 148 results in the imparting of a small oscillatory motion to rod 142 and piston 140 which is transmitted by the hydraulic fluid to arm 114 and head 18. The application of a vernier control signal to one of coils 144 or 146 results in a small linear displacement of rod 142 and piston 140 which is transmitted to arm 114 by the hydraulic fluid. This action causes a vernier adjustment of the position of arm 114 and head 18 in accordance with the movement of piston 140.

Associated with the upper end of ferrous rod 142 is detent 150 and support 158. Detent 150 is biased to a non-contacting position by a light spring 152 acting against detent support 156. Wound around detent 150 is coil 154 which is connected to OR circuit 160. When coil 154 is energized by OR circuit 160, it acts to oppose spring 152 and causes detent 150 to press ferrous rod 142 against support 158 thereby immobilizing the rod 142 and piston 140. There are two times in the operation of this device during which it is desirable to detent rod 142 and piston 140; first when the head 18 is being coarsely positioned and second when the vernier positioning signals are removed due to the action of gates 35 and 37.

One input to OR circuit 160 is a conductor 162 from cable 102. Each time coarse positioning signals are placed on cable 102 by coarse position control 24, a conditioning signal is placed on conductor 162 whose duration is identical to the actuation time of the largest piston (122). By this means, detent 150 is detented by coil 154 during the time that the coarse positioning of arm 114 is taking place thereby preventing the movement of piston 140.

Another input to OR circuit 160 is conductor 108 from inverter 33. When conductor 108 becomes energized, indicating the arm 114 and head 18 are correctly positioned, the output of OR circuit 160, as applied to coil 154, again actuates detent 150 and immobilizes rod 142 and piston 140. This action maintains the corrected position of piston 140 and arm 114 after the vernier correction signals are removed by gates 35 and 37. If detent 150 were not energized at this time, springs 178 and 180 would return ferrous rod 142 and piston 140 to its zero position thereby nullifying any corrective action already taken.

An alternative means for applying the dither motion to arm 114 is illustrated in FIG. 6. In this embodiment a portion 168 of arm 114 is composed of a magnetostrictive material such as nickel. Coil 148, instead of being wound around ferrous rod 142, is now wound around magnetostrictive portion 168 of arm 114. The output of dither oscillator 26 is applied via conductor 68 to coil 148 which induces the alternating voltage variations into magnetostrictive portion 168. The induced alternating voltage causes magnestostrictive portion 168 to minutely expand and contract in coincidence therewith, thereby imparting to magnetic head 18 the required dither.

It should be realized that the above described versions of a head actuator 22 are merely exemplary and that any head actuating mechanism which comprises both coarse and vernier positioning mechanisms could be utilized.

While the invention has been particularly shown and described with reference to a preferred embodiment thereof, it should be understood by those skilled in the art that the foregoing and other changes in form and details may be made therein without departing from the spirit and scope of the invention.

I claim:

1. A servo control for a data processing device comprising:

a data record member having a plurality of discrete data tracks of data representations, each track disposed at a different track position on said record member;

sensing means operable to sense said data representations at any selected track on said record member and to produce data signals indicative of said sensed data representations;

positioning means operable in response to coarse positioning singals to render said sensing means responsive to a data track by positioning said sensing means at the selected track position on said record member, and further operative in response to a first vernier positioning signal to move said sensing means in a first direction, transverse to the selected track, and to a second vernier positioning signal to move said sensing means in a direction opposite to said first direction;

oscillator means for applying an oscillatory signal to said positioning means to thereby vary the exact position of said sensing means in relation to the position of said selected track and to cause an amplitude modulation of said data singals;

comparing means having inputs connected to said oscillator and said sensing means and first and second vernier signal outputs connected to said positioning means, said comparing means including means to generate a signal on said first vernier signal output when said oscillatory signal and the amplitude modulation envelope of said data signals are in phase, and to generate a signal on said second vernier signal output when said oscillatory signal and the amplitude modulation envelope of said data signals are opposed in phase;

whereby said positioning means, in response to said vernier signals, is caused to move said sensing means to compensate for undesired positional deviations of said sensing means from the optimum sensing position for said selected track.

2. A servo control for a data processing device comprising:

a data record member having a plurality of discrete data tracks of data representations, each track disposed at a different track position on said record member;

sensing means operable to sense said data representations at any selected track on said record member;

positioning means operable in response to coarse positioning signals, to render said sensing means responsive to a data track by positioning said sensing means at the selected track position on said record member; and further operative in response to a first vernier positioning signal to move said sensing means in a first direction transverse to the selected track and to a second vernier positioning signal to move said sensing means in a direction opposite to said first direction;

oscillator means for applying an oscillatory signal to said positioning means to thereby vary the exact position of said sensing means in relation to said selected track position and to cause an amplitude modulation of said data singals;

a phase comparator having inputs connected to said oscillator and said sensing means and first and second signal outputs, said comparator generating a signal on said first signal output when said oscillatory signal and the amplitude modulation envelope of said data signals are in phase, and a signal on said second signal output when said oscillatory signal and the amplitude modulation envelope of said data signals are opposed in place, and means connected between said positioning means and said signal outputs of said phase comparator for producing a first vernier positioning signal in response to a first signal output from said phase comparator and for producing a second vernier positioning signal in response to a second output from said phase comparator;

whereby said positioning means in response to said vernier correction signals, moves said sensing means to compensate for undesired deviations of said sensing means from the optimum sensing position for said selected track.

3. In a magnetic memory the combination comprising:

a rotating magnetic disc having a plurality of continuous data tracks of data representations;

a magnetic transducer adapted to sense said data representations contained in said tracks and to produce data signals indicative of said sensed data representations;

positioning means operable in response to coarse positioning signals, to render said magnetic transducer responsive to the data representations contained in a data track by positioning said magnetic transducer at a selected track on said disc; and further operative in response to a first vernier positioning signal to move said magnetic transducer in a first direction transducer to the selected track and to a second vernier positioning signal to move said magnetic transducer in a direction opposite to said first direction;

oscillator means for applying an oscillatory signal to said positioning means to thereby vary the exact position of said magnetic transducer in relation to said selected track position and to cause an amplitude modulation of said data signals;

comparing means having inputs connected to said oscillator and said magnetic transducer and vernier signal outputs connected to said positioning means, said comparing means generating a signal on a first vernier signal output when said oscillatory signal and the amplitude modulation envelope of said data signals are in phase, and a signal on a second vernier signal output when said oscillatory signal and the amplitude modulation of said data signals are opposed in phase;

whereby said positioning means, in response to said vernier output signals, is caused to move said magnetic transducer to compensate for undesired deviations of said magnetic transducer from the optimum sensing position for said selected track.

4. In a magnetic memory, the combination comprising:

a continuously rotating magnetic record member having a plurality of continuous data tracks wherein data representations are recorded;

an arm having a portion composed of a magnetostrictive material;

a coil wound around said magnetostrictive portion;

a magnetic head mounted at one extremity of said arm and adapted to sense said data representations, and to generate data signals indicative thereof;

positioning means associated with the opposite extremity of said arm and operable in response to coarse positioning signals to position said magnetic head at a selected data track on said magnetic record and further operative in response to a first vernier positioning signal to move said arm and said magnetic head in a first direction transverse to the selected track, and to a second positioning signal to move said arm and said magnetic head in a direction opposite to said first direction;

a sinusoidal oscillation generator connected to said coil, said coil inducing oscillations into said magnetostrictive portion of said arm thereby resulting in a transverse oscillatory movement of said magnetic head across the selected data track, whereby said generated data signals attain a periodic amplitude modulation envelope;

comparing means having inputs connected to said sinusoidal oscillation generator and said magnetic head, and vernier signal outputs connected to said positioning means, said comparing means generating a signal on a first vernier signal output when the output of said sinusoidal oscillation generator and said periodic amplitude modulation envelope are in phase and a signal on a second vernier signal output when the output of said sinusoidal oscillation generator and said modulation envelope are opposed in phase;

whereby said positioning means, in response to said vernier output signal, is caused to move said arm and said magnetic head to compensate for undesired deviations of said magnetic head from the optimum sensing position for said selected data track.

5. The invention as set forth in claim 4 with the further provisions of:

a filter connected to said magnetic head for generating an output in response to the appearance of a frequency component in said periodic amplitude modulation envelope of twice the frequency of the output of said oscillation generator; and disabling means connected between the vernier outputs of said comparing means and said positioning means and responsive to the output of said filter for interrupting the input to said positioning means for said comparing means.

References Cited in the file of this patent

UNITED STATES PATENTS 3,007,144 Hagopian -------------- Oct. 31, 1961

UNITED STATES PATENT OFFICE

CERTIFICATE OF CORRECTION

Patent No. 3,126,535 March 24, 1964

Donald N. Streeter

It is hereby certified that error appears in the above numbered patent requiring correction and that the said Letters Patent should read as corrected below.

Column 1, line 22, for "the", first occurrence, read -- that --; column 2, line 37, for "lead" read -- leads --; column 6, lines 49 and 62, and column 7, line 25, for "singals", each occurrence, read -- signals --; column 7, line 34, for "place," read -- phase; --; column 8, line 67, for "for" read -- from --.

Signed and sealed this 22nd day of September 1964.

;EAL)

:est:

ɩNEST W. SWIDER
.esting Officer

EDWARD J. BRENNER
Commissioner of Patents